United States Patent [19]

Hauge et al.

[11] 3,953,039
[45] Apr. 27, 1976

[54] TOOLHOLDER FOR MACHINE TOOLS

[75] Inventors: Robert Z. Hauge, Oradell; George J. Loos, Parsippany, both of N.J.; Matthew F. Marsicano, Forest Hills, N.Y.

[73] Assignee: Textron Inc., Providence, R.I.

[22] Filed: Apr. 9, 1975

[21] Appl. No.: 566,394

Related U.S. Application Data

[62] Division of Ser. No. 501,865, Aug. 30, 1974.

[52] U.S. Cl. ................................ 279/1 TS; 29/568
[51] Int. Cl.² ...................... B23B 5/22; B23Q 1/00
[58] Field of Search .................. 279/1 TS; 29/568; 82/36

[56]  References Cited
UNITED STATES PATENTS 3,811,179  5/1974  Anderson .............................. 29/568

*Primary Examiner*—Harrison L. Hinson
*Attorney, Agent, or Firm*—Arthur A. Johnson

[57] ABSTRACT

There is disclosed herein a toolholder for use in machine tools, particularly those of the type having means for automatically changing tools according to a predetermined plan, the toolholder being transported from a tool rack to a spindle for use and being returned to the tool rack when it has served its purpose. The toolholder has two flanges forming two annular grooves, one groove shaped to receive holding means on the tool rack and the other groove shaped to receive the edges of a socket in the tool transporting means; one flange having a single peripheral keyway to receive a key on the tool rack to maintain the circular orientation of the toolholder and tool therein when being stored on the rack and the other flange having two usually diametrically placed slots, one to engage a driving key on the spindle with which the tool is used, and the other to be engaged by a key on the carrier by which the tool and toolholder is transported to and from the spindle, said keys serving to maintain the desired 360° circular orientation of the tool while it is in the spindle while being transported between the spindle and the tool rack, each key being characteristically shaped to fit only its companion slot.

1 Claim, 7 Drawing Figures

U.S. Patent   April 27, 1976   3,953,039
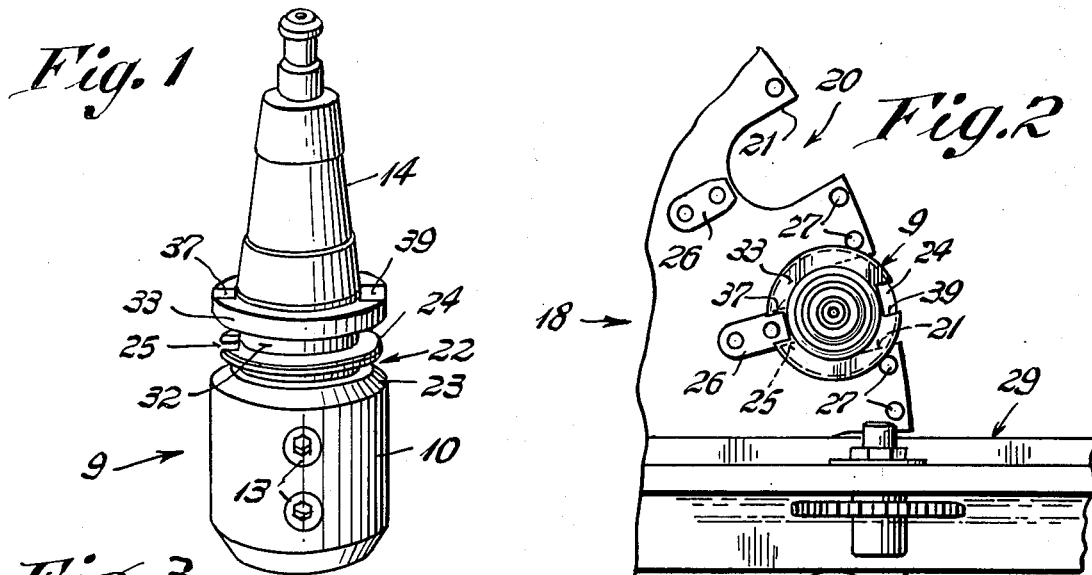
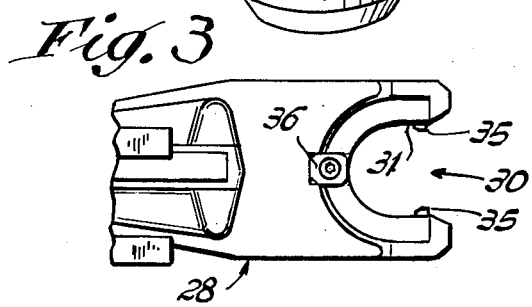
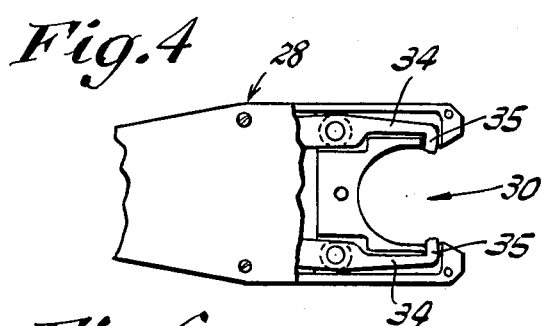
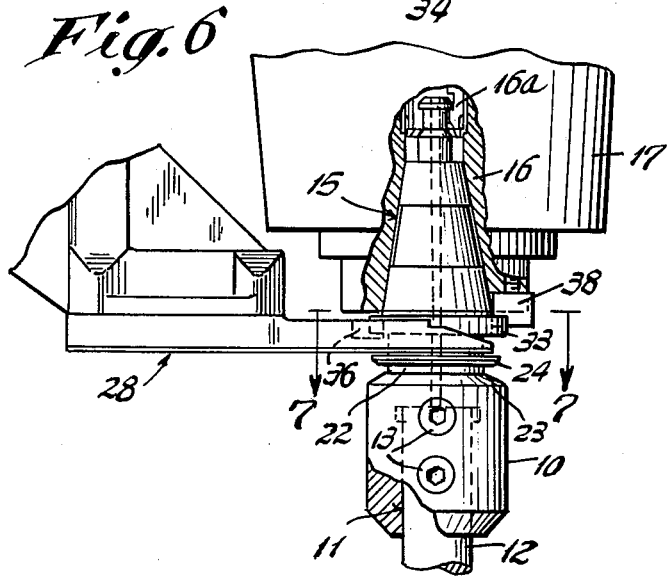
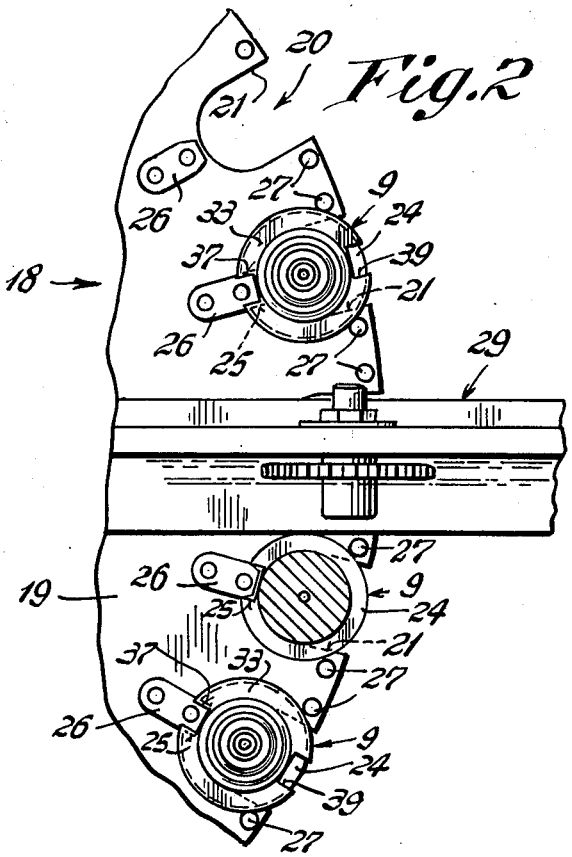
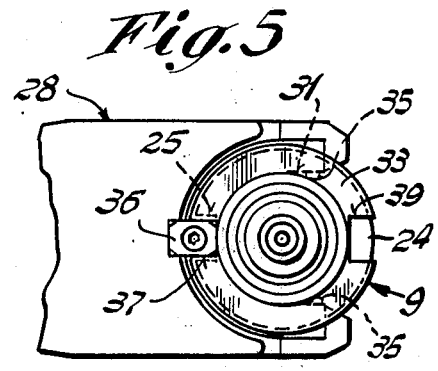
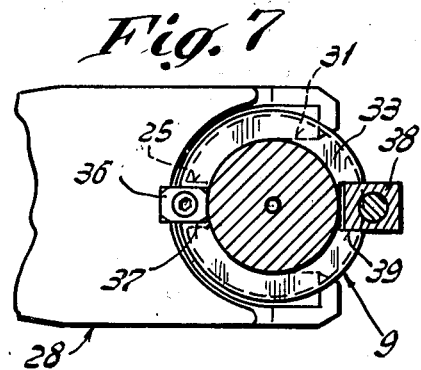

TOOLHOLDER FOR MACHINE TOOLS

This invention relates to toolholders for use in machine tools, particularly those used with automatic tool changing means, and this application is a division of our application Ser. No. 501,865, filed Aug. 30, 1974.

In the use of such machines it is frequently important, and many times imperative, that the circular orientation of the tool be maintained in the spindle, in the storage rack and in the means for transporting the tool between the spindle and the storage rack.

An object of this invention is to provide simple and convenient means for so maintaining said orientation of working tools in said tool-changing machine.

This is accomplished in the form of the invention, herein illustrated and described, by providing a toolholder having a mounting portion, generally frusto-conical, to fit a socket in the spindle, a body portion having a socket to receive and hold one end of a working tool, and a flange on the body portion provided with two peripheral radial slots, one such slot shaped to fit and receive only the key on the end of the spindle and the other shaped to fit and receive only the key on a carriage which transports the tool from the spindle to the tool rack. The slots and their cooperating keys are shaped so that each lug can fit only its companion slot and one slot in the toolholder is diametrically opposite the other slot.

Another feature of this invention is the provision of means whereby the toolholder may be conveniently supported in the tool rack in desired oriented position. For this purpose the toolholder body is provided with a second flange which is spaced from the adjacent portion of the toolholder body to receive the edges of radial slots in the tool rack, said second flange being provided with a peripheral radial slot to receive a key fixed on the tool rack.

By having separate toolholder support flanges for engagement respectively with the transporting means and the tool rack, it is possible to have the toolholder supported simultaneously by the transporting means and the tool rack during the removal of the tool from the tool rack and by having the key-receiving slot in the transporting means and in the tool rack the desired orientation of the tool and toolholder is assured when it reaches the spindle.

Other features and advantages will hereinafter appear.

In the accompanying drawings:

FIG. 1 is a perspective view of a toolholder made according to the present invention.

FIG. 2 is a plan view of a portion of a tool rack showing several toolholders supported thereon and a portion of the track on which the tool-transporting carriage is mounted.

FIG. 3 is a plan view of a portion of the toolholder carriage.

FIG. 4 is a bottom plan view of the part of the carriage shown in FIG. 3 showing particularly the fingers for releasably holding a toolholder in the socket.

FIG. 5 is a plan view like FIG. 3 but showing a toolholder held in the carriage.

FIG. 6 is a side view showing a portion of the carriage for transporting a toolholder and its tool and a portion of the spindle and spindle housing, the latter being shown partly in section.

FIG. 7 is a section taken on the line 7—7 of FIG. 6.

As shown in the accompanying drawings, the toolholder 9 shown in FIG. 1 comprises a body portion 10 which has a central hole 11 to receive the end of a working tool 12 which may be secured therein against removal or turning by one or more set screws 13. The body portion 10 usually has a generally conical mounting portion 14 which fits within a cavity 15 in the nose of a spindle 16 rotatably mounted and axially movable in a spindle frame 17.

When not in use, the toolholders 9 are supported (in the form of the invention illustrated and described herein) in a tool rack 18 comprising a circular supporting plate 19 (a section of which is shown in FIG. 2) having in its peripheral margin a plurality of spaced U-shaped sockets 20. The edge portion 21 of each socket is shaped to extend into an annular groove 22 between the top 23 of the body portion 10 and a flange 24 thereon as shown in FIGS. 1 and 2.

In order to maintain the desired circular orientation of the toolholders in the sockets 20 of the tool rack, each toolholder has in its flange 24 a radial key slot 25 which is shaped to snugly fit a key 26 fixed to the plate 19 of the tool rack which prevents the toolholder from rotating in the socket 20.

The toolholder may be releasably held in its socket 20 by suitable means, such as posts 27 shown in FIG. 2, behind which the flange 24 falls as the carriage deposits the toolholder in the socket 20.

For transporting one toolholder at a time from the tool rack 18 to the spindle, there is provided a carriage 28 (a portion of which is shown in FIGS. 3 to 7 inclusive) which travels on a track 29 from a position over the tool rack 19 into engagement with a toolholder (placed in the path of the carriage by previous rotation of the tool rack) and carrying it to the spindle.

For this purpose the carriage 28 has a toolholder-receiving socket 30, the bottom of which is substantially semicircular and has an edge portion 31 shaped to slidably fit an annular groove 32 in the body 10 formed by the flange 24 and a flange 33 as shown in FIG. 1.

As shown in FIG. 4, the carriage 28 is provided with a pair of retractable fingers 34, one mouned at each side of the socket 30 and having projections 35 which extend into the groove 32 and engage the toolholder at points beyond the diameter of the body at the bottom of the groove to releasably hold the toolholder in the socket 30 in the carriage.

Assuming that there is no toolholder in the spindle, after a toolholder has been grasped by the fingers 34, the toolholder is carried by the carriage toward the spindle to a position where the carriage and the toolholder are raised, and the toolholder is deposited in the spindle where it is grasped and retained in the spindle by the drawbar 16a.

When the carriage engages the toolholder when so moving it to the spindle, a key 36 on the carriage engages a key slot 37 in the flange 33 which prevents rotation of the toolholder in the socket and maintains the circular orientation of the toolholder on the carriage.

To maintain the circular orientation of the toolholder in the spindle, the nose of the latter is provided with a key (see FIGS. 6 and 7) which slidably fits in a key slot 39 in the flange 33 located diametrically opposite the slot 37 in the toolholder. Since the key 36 on the carriage engages the slot 37 simultaneously with the engagement of the key 38 in the key slot 39 on the carriage, the orientation of the toolholder in the carriage will be maintained while the toolholder is in the spindle.

After the toolholder is secure in the spindle, the carriage is retracted from the spindle and returns empty to the tool rack.

After the work with the tool then in the spindle has been completed, the spindle is moved by hand or automatically as disclosed in said application Ser. No. 501,865, to a predetermined position axially and rotatively, the empty carriage is caused to travel to the spindle whereupon the key 36 on the carriage is engaged in the slot 37 in the toolholder and the fingers 34 are caused to grasp the toolholder. When this has occurred, the carriage and toolholder are caused to descend withdrawing the used toolholder from the spindle and the carriage is then returned to the empty socket 20 in the tool rack from which it had been taken. When the toolholder moves into the socket 20, the slot 25 in the toolholder receives the key 26 on the tool rack which maintains the desired orientation of the tool and toolholder until that tool is again required.

After the used toolholder has been deposited in its socket 20, the fingers 34 are released and the carriage is moved clear of the toolholder resulting in the key 36 being withdrawn from the slot 37 on the carriage and the tool rack is free to be rotated to bring the next tool to be used to the position to be engaged by the carriage.

It will be observed that at all times orientation of the toolholder is maintained except when the toolholder is in use in the spindle and then it is maintained relative to the spindle.

Variations and modifications may be made within the scope of the claims and portions of the improvements may be used without others.

We claim:

1. For use with a machine tool having a spindle provided with a driving key, a tool storage rack having a plurality of open tool-receiving sockets and transport means including a carriage having an open toolholder-receiving socket for transferring the toolholder between said storage rack and said spindle, each said socket having a tool locating key, the toolholder having a body portion having at one end means to receive and hold the shank of a working tool, at the other end a mounting portion shaped to fit a corresponding cavity in the nose of a spindle, and an intermediate portion of the body having two spaced flanges forming two axially spaced annular grooves between said body portion and said mounting portion, one of said grooves being positioned and shaped to receive toolholder-supporting means on said carriage and the other of said grooves being positioned and shaped to receive the edges of one of said plurality of tool-receiving sockets in said tool storage rack to support the toolholder therein, said flanges being axially spaced whereby one of said grooves may receive said toolholder-supporting means on said carriage at the same time that the other of said annular grooves receives said toolholder means on said storage rack while moving the toolholder onto or off the tool storage rack, the improvement comprising one of said flanges having radially extending diametrically opposite peripheral key slots, one of said key slots being shaped and positioned to receive said driving key on the spindle and the other of said slots being shaped and positioned to receive said holding key on said transport means to maintain the circular orientation of the toolholder while the latter is being transported between the spindle and the rack, and the other of said flanges having solely one radially extending peripheral key slot shaped and positioned to receive a key on said tool storage rack whereby the toolholder may be positioned on said storage rack in solely one circular oriented location and maintained in such location while supported on said rack.

* * * * *

UNITED STATES PATENT AND TRADEMARK OFFICE
CERTIFICATE OF CORRECTION

PATENT NO. : 3,953,039
DATED : April 27, 1976
INVENTOR(S) : Robert Z. Hague, George J. Loos & Matthew F. Marsicano It is certified that error appears in the above-identified patent and that said Letters Patent are hereby corrected as shown below:

The name "Robert Z. Hauge" should read --Robert Z. Hague--

Column 2, line 42 "mouned" should read --mounted--.

*Signed and Sealed this*

Thirteenth *Day of* July 1976

[SEAL]

*Attest:*

RUTH C. MASON
*Attesting Officer*

C. MARSHALL DANN
*Commissioner of Patents and Trademarks*